(12) United States Patent
Thomas et al.

(10) Patent No.: US 9,027,674 B2
(45) Date of Patent: May 12, 2015

(54) CUSTOM SHAPED BLANK

(75) Inventors: Jeffrey G. Thomas, Magnolia, TX (US); Ronald E. Joy, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 13/514,482

(22) PCT Filed: Jun. 22, 2011

(86) PCT No.: PCT/US2011/041473
§ 371 (c)(1),
(2), (4) Date: Jun. 7, 2012

(87) PCT Pub. No.: WO2012/177252
PCT Pub. Date: Dec. 27, 2012

(65) Prior Publication Data
US 2014/0144711 A1 May 29, 2014

(51) Int. Cl.
E21B 10/36 (2006.01)
E21B 10/42 (2006.01)

(52) U.S. Cl.
CPC .................................... *E21B 10/42* (2013.01)

(58) Field of Classification Search
USPC ...................... 175/374, 425; 76/108.2, 108.4
See application file for complete search history.

(56) References Cited

U.S. PATENT DOCUMENTS

| | | |
|---|---|---|
| 3,314,490 A | 4/1967 | Hildebrandt |
| 3,318,400 A | 5/1967 | Hildebrandt |
| 3,322,218 A | 5/1967 | Hildebrandt |
| 3,471,921 A | 10/1969 | Feenstra |
| 3,537,538 A | 11/1970 | Generoux |
| 3,709,308 A | 1/1973 | Rowley et al. |
| 3,757,878 A | 9/1973 | Wilder et al. |
| 4,073,354 A | 2/1978 | Rowley et al. |
| 4,234,048 A | 11/1980 | Rowley |
| 4,667,756 A | 5/1987 | King et al. |
| 4,669,522 A | 6/1987 | Griffin |
| 4,720,371 A | 1/1988 | Shirley |
| 4,883,132 A | 11/1989 | Tibbitts |
| 5,033,560 A | 7/1991 | Sawyer et al. |
| 5,090,491 A | 2/1992 | Tibbitts et al. |
| 5,373,907 A | 12/1994 | Weaver |
| 5,441,121 A | 8/1995 | Tibbitts |

(Continued)

FOREIGN PATENT DOCUMENTS

WO WO2012/177252 A1 12/2012

OTHER PUBLICATIONS

Ortiz, Blas, "Novel Matrix Drill Bit Design Extends the Envelope for Soft Formation Drilling," IADC/SPE Asia Pacific Drilling Technology Conference & Exhibition held in Kuala Lumpur, Malaysia, Sep. 9-11, 1996, IADC/SPE 36410.

*Primary Examiner* — William P Neuder
(74) *Attorney, Agent, or Firm* — McDermott Will & Emery LLP; Alan Bryson

(57) ABSTRACT

A blank may include a tang section, a base section, and an angled section with a recess. The tang section may have an outer surface with an outer diameter. The base section may have an outer surface with a diameter greater than the outer diameter of the tang section. The angled section may lie between the tang section and the base section and may have an outer surface that transitions in diameter from the outer diameter of the tang section to the outer diameter of the base section. The recess in the angled section may be shaped to engage a tip of a former.

11 Claims, 7 Drawing Sheets

(56) References Cited

U.S. PATENT DOCUMENTS

| | | |
|---|---|---|
| 5,662,183 A | 9/1997 | Fang |
| 5,839,329 A | 11/1998 | Smith et al. |
| 6,073,518 A | 6/2000 | Chow et al. |
| 6,116,360 A | 9/2000 | Evans |
| 7,044,243 B2 | 5/2006 | Kembaiyan et al. |
| 7,398,840 B2 | 7/2008 | Ladi et al. |
| 7,950,887 B2 * | 5/2011 | Dietz et al. .................... 411/386 |
| 2012/0148703 A1 * | 6/2012 | Duclos ......................... 425/214 |

* cited by examiner

CUSTOM SHAPED BLANK

BACKGROUND

The present disclosure relates to drill bits and more particularly to custom shaped blanks for use in manufacturing drill bits.

In traditional molding of drill bits, molten metal flows into a hollow mold assembly containing a blank. Blank designs are typically axial-symmetrical, with constant outer diameters, inner diameters, tang outer diameters, and tang lengths for a given design. In order to avoid nozzle displacements and maximize steel volume in the mold assembly, the tang outer diameter, length, inner diameter, angle, and thickness of the blank may be varied while maintaining axial symmetry. Junk slots may be formed in the drill bits by providing sand or other material in the mold assembly at the desired location of the junk slot. However, the junction between the junk slot sand tip and the blank results in webbing in the resulting matrix bit. This webbing is a triangular-like piece of material left in the junk slot between blades of the drill bit after other excess material has been turned off of the drill bit. Such webbing is typically ground away, which is time consuming and costly, may be damaging to the matrix bit, and may pose a safety risk.

BRIEF DESCRIPTION OF THE DRAWINGS

The following figures are included to illustrate certain aspects of the present disclosure, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present disclosure relates to drill bits and more particularly to custom shaped blanks for use in manufacturing drill bits. Of the many advantages of the present disclosure, only a few of which are discussed or alluded to herein, the present disclosure provides an improved structure for allowing a former and a blank to engage in a manner that reduces or eliminates webbing formed in traditional matrix bit construction. As used herein, the term "engage" is intended to include abutting arrangements, whether in direct or indirect contact, or separated by a small gap. For example, a former and a blank may be considered to engage one another, even if a gap of approximately ¼" is present between them, so long as the former and the blank are configured to fit together.

Figure 1:
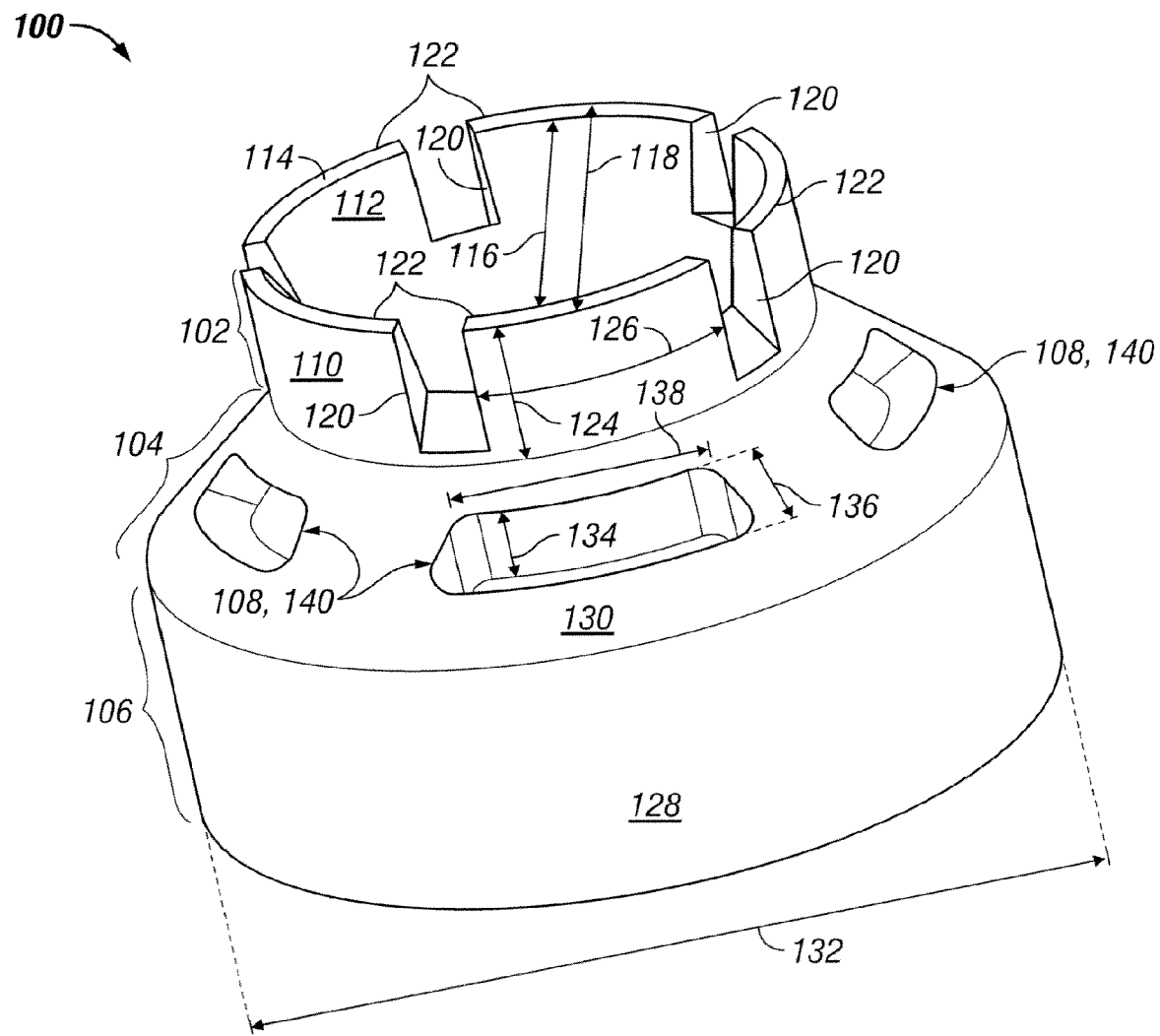
FIG. 1 is a perspective view of a blank in accordance with one embodiment of the present disclosure.

Referring now to FIG. 1, blank 100 may have tang section 102, angled section 104, and base section 106. Angled section 104 may have one or more recesses 108 shaped to engage tip 702 of former 700 (illustrated in FIG. 7). Thus, when tip 702 (illustrated in FIG. 7) enters recess 108, and matrix material 802 (illustrated in FIGS. 8 and 9) is introduced to form matrix hit 800 (illustrated in FIG. 8), resulting webbing may be reduced or eliminated, which may result in improvements in integrity of matrix bit 800, as well as reduce costs in post infiltration grinding.

Blank 100 may be constructed of AISI 1018 steel, other weldable steel grades and non-ferrous alloys, or other materials suitable for use at infiltration temperatures. Blank 100 may be formed by machining, such as milling or turning. Alternatively, blank 100 may be formed by casting or forging. Blank 100, including tang section 102, angled section 104, and base section 106 may be integrally formed of the same material (e.g., steel). Thus, tang section 102, angled section 104, and base section 106 may not be distinct sections, but may rather indicate general portions of blank 100.

Tang section 102 may mechanically lock blank 100 into the matrix bit head material. Tang section 102 may have outer surface 110 and inner surface 112 separated by distal surface 114. Inner surface 112 may have inner diameter 116 and outer surface 110 may have outer diameter 118 sized to fit in mold assembly 902 about nozzle displacements 918 (illustrated in FIG. 9). Tang section 102 may include one or more cuts 120 to provide a bond for torsional loads and relieve hoop stress while cooling from an infiltration temperature. Tang section 102 may fit around nozzle displacements 918 (illustrated in FIG. 9) and maximize the amount of steel in matrix bit 800 (illustrated in FIG. 8). Cuts 120 may be formed by torch, machined, or otherwise formed in tang section 102. Thus, tang section 102 may be formed of multiple individual tangs 122 having optimized length 124 and width 126. Length 124 and width 126 for tangs 122 may be selected to fit around nozzle displacements 918 (illustrated in FIG. 9). Tangs 122 may be symmetrical in length 124 and width 126, or length 124 and width 126 may vary from one tang 122 to another tang 122. Tang section 102 may also have radial grooves (not illustrated) formed in outer surface 110 and/or inner surface 112 by milling or otherwise, to increase surface area for mechanical bonding between blank 100 and matrix material 802 (illustrated in FIG. 8), provide increased surface area for grip and improved mechanical bonding, and potentially help reduce crack propagation.

At a portion of tang section 102 opposite distal surface 114, tang section 102 may border angled section 104. Angled section 104 is sometimes referred to as "the 45" because it is commonly angled at 45 degrees relative to outer surface 110 of tang section 102 and outer surface 128 of base section 106. Angled section 104 may lie generally between tang section 102 and base section 106 with outer surface 130 that transitions in dimension from outer diameter 118 of outer surface 110 of tang section 102 to outer diameter 132 of outer surface 128 of base section 106, which may be larger than outer diameter 118 of tang section 102. Outer surface 130 of angled section 104 may transition uniformly from outer surface 110 of tang section 102 to outer surface 128 of base section 106. Alternatively, angled section 104 may transition non-uniformly between tang section 102 and base section 106. Angled section 104 may also have radial grooves (not illustrated) formed in outer surface 130 by milling or otherwise, to increase surface area for mechanical bonding between blank 100 and matrix material 802 (illustrated in FIG. 8), provide increased surface area for grip and improved mechanical bonding, and potentially help reduce crack propagation. Such grooves may extend into one or more recesses 108 formed in outer surface 130 of angled section 104.

One or more recesses 108 may be formed in outer surface 130 of angled section 104. Recess 108 may be formed by machining, and more specifically by milling or turning. The general shape of recess 108 may be configured to engage tip 702 of former 700 (illustrated in FIG. 7). Depending on the design of associated matrix bit 800 (illustrated in FIG. 8), recess 108 may have a variety of different geometries. In some embodiments, recess has depth 134, width 136, and/or length 138 suitable for engaging tip 702 of former 700 (illustrated in FIG. 7). Such depth 134 may be a maximum dimension measured from an edge of recess 108 intersecting outer surface 130 of angled section 104 to a point in recess 108 furthest from tang section 102. Depth 134 may indicate how far tip 702 of former 700 (illustrated in FIG. 7) may be inserted before being stopped. In other words, depth 134 may represent the length of a portion of tip 702 of former 700 that can be accommodated. In some instances, such as those where a gap is desired between former 700 and blank 100, depth 134 may be larger than the portion of tip 702 intended to be inserted in recess 108, so as to allow for such a gap. In various embodiments, depth 134 may be from about 1/16" to about 2", or more specifically from about 1/4" to about 1". Width 136 may refer to the maximum dimension measured from an edge of recess 108 nearest tang section 102 to an edge of recess nearest base section 106. In various embodiments, width 136 may be from about 1/4" to about 2", or more specifically from about 1/2" to about 1 1/2". Length 138 may refer to the maximum dimension measured orthogonal to depth 134 and width 136. In various embodiments, length 138 may be continuous, such that recess 108 forms a complete ring, circle, or other continuous form. In other embodiments, recess may be intermittent about blank. In such embodiments, length 138 may be from about 1/2" to about 8", or more specifically from about 1" to about 4".

Referring still to FIG. 1, in some embodiments, recess 108 is in the form of one or more wells 140. In such an embodiment, well 140 may be formed in outer surface 130 of angled section 104, such that base section 106 remains unchanged. Well 140 may be elongated and curved along length 138 as illustrated, or well 140 may be round (e.g., drilled), rectangular, or any of a number of other shapes suitable for engagement with at least one tip 702 of former 700 (illustrated in FIG. 7). Well 140 may be a blind hole (i.e., formed only in angled section 104), or well 140 may extend into or through base section 106.

Figure 2:
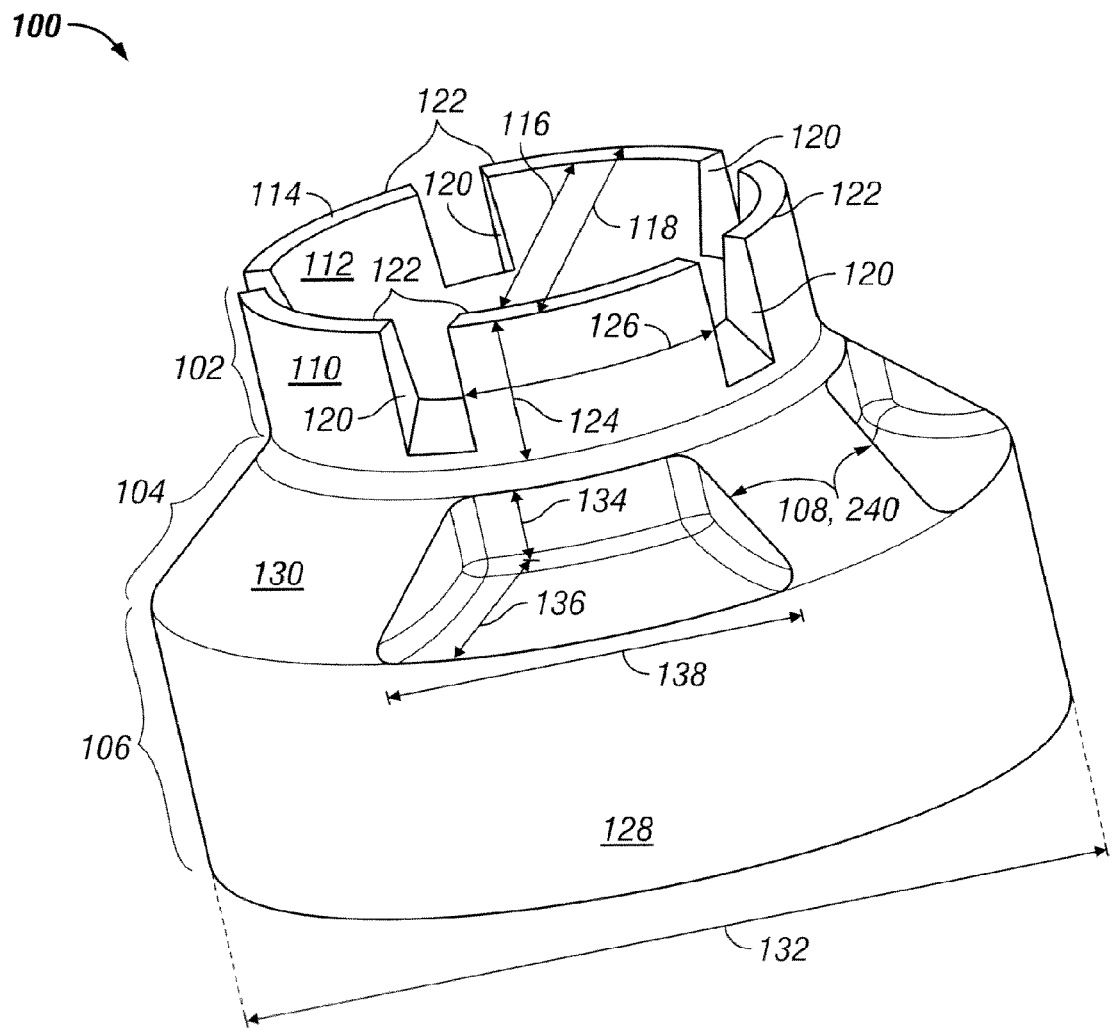
FIG. 2 is a perspective view of a blank in accordance with another embodiment of the present disclosure.

Referring now to FIG. 2, in some embodiments, recess 108 is in the form of one or more shoulders 240. In such an embodiment, shoulder 240 may be formed in outer surface 130 of angled section 104, such that base section 106 remains unchanged, but forms a boundary of recess 108. Shoulder 240 may be elongated and curved along length 138, as illustrated, or shoulder 240 may have other shapes suitable for engagement with at least one tip 702 of former 700 (illustrated in FIG. 7).

Figure 3:
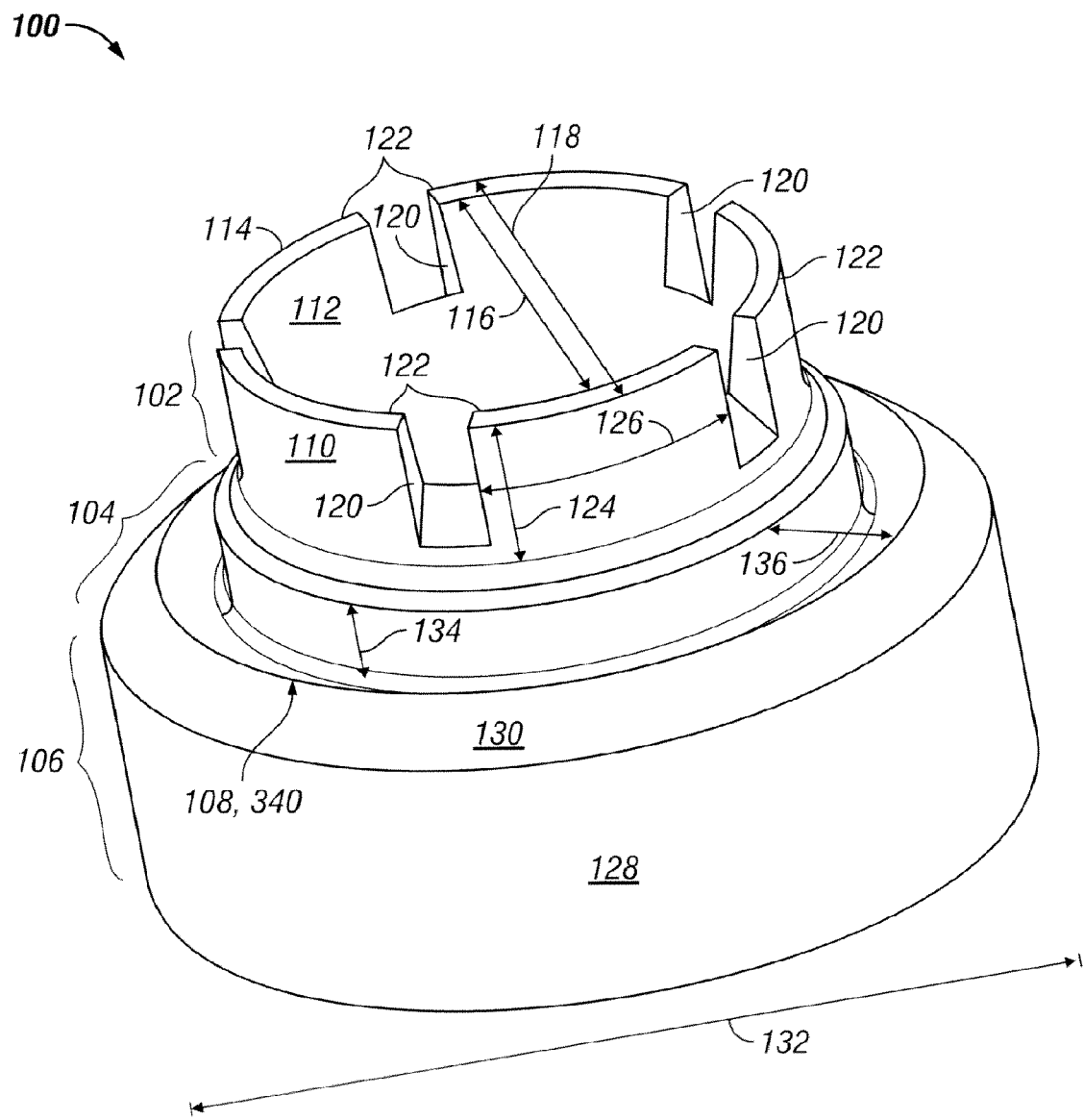
FIG. 3 is a perspective view of a blank in accordance with another embodiment of the present disclosure.

Referring now to FIG. 3, in some embodiments, recess 108 is in the form of one or more moats 340. In such an embodiment, moat 340 may be formed in outer surface 130 of angled section 104, such that base section 106 remains unchanged. Moat 340 may be continuously curved along length 138, as illustrated, or moat 340 may have portions of different shapes, such as, but not limited to octagonal, hexagonal, pentagonal, and other shapes suitable for engagement with at least one tip 702 of former 700 (illustrated in FIG. 7).

Figure 4:
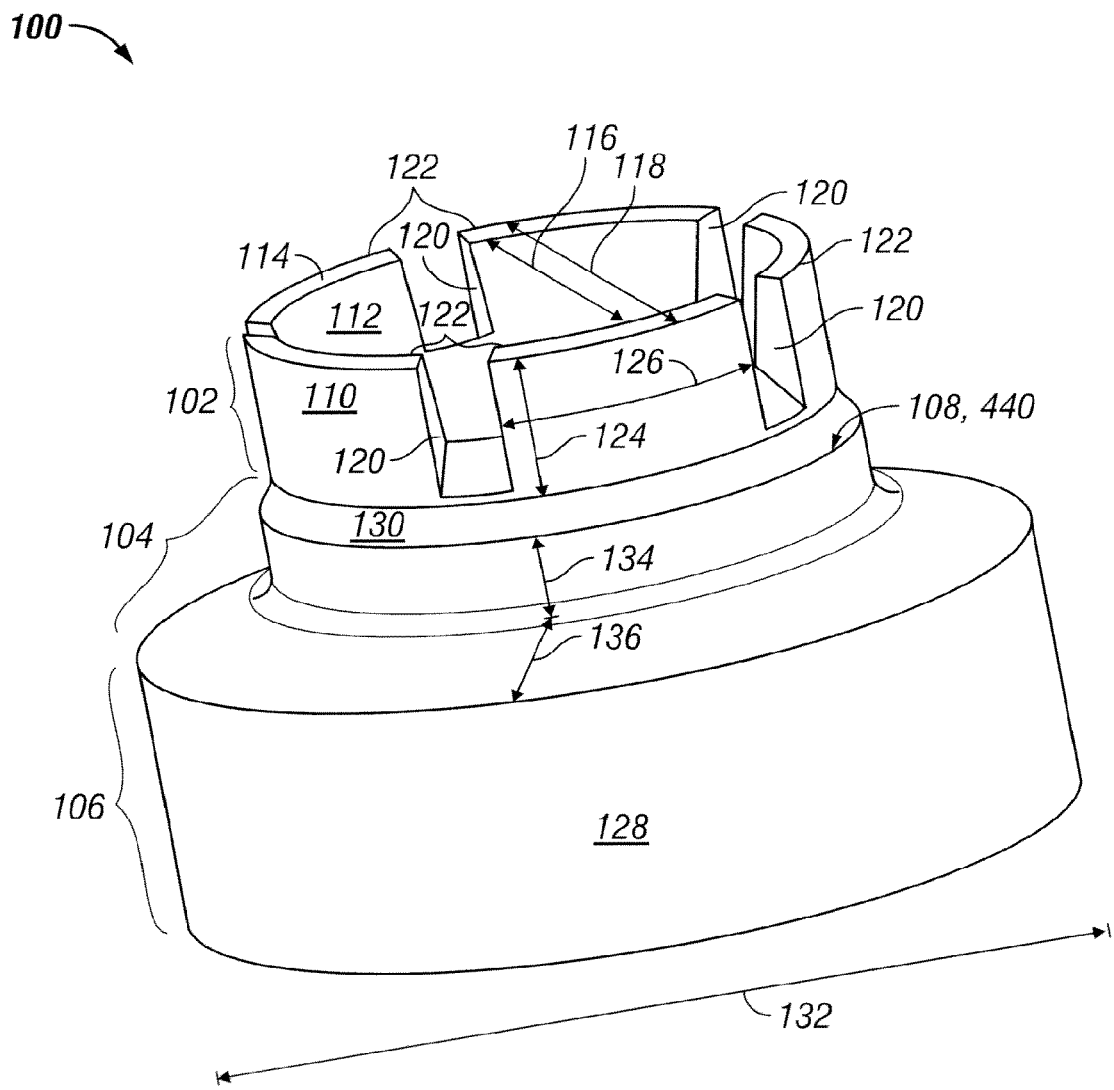
FIG. 4 is a perspective view of a blank in accordance with another embodiment of the present disclosure.

Referring now to FIG. 4, in some embodiments, recess 108 is in the form of cutaway 440. In such an embodiment, cutaway 440 may be formed in outer surface 130 of angled section 104, such that base section 106 remains unchanged, but forms a continuous boundary of recess 108. Cutaway 440 may be continuously curved along length 138, as illustrated, or cutaway 440 may have portions of different shapes suitable for engagement with at least one tip 702 of former 700 (illustrated in FIG. 7).

Figure 5:
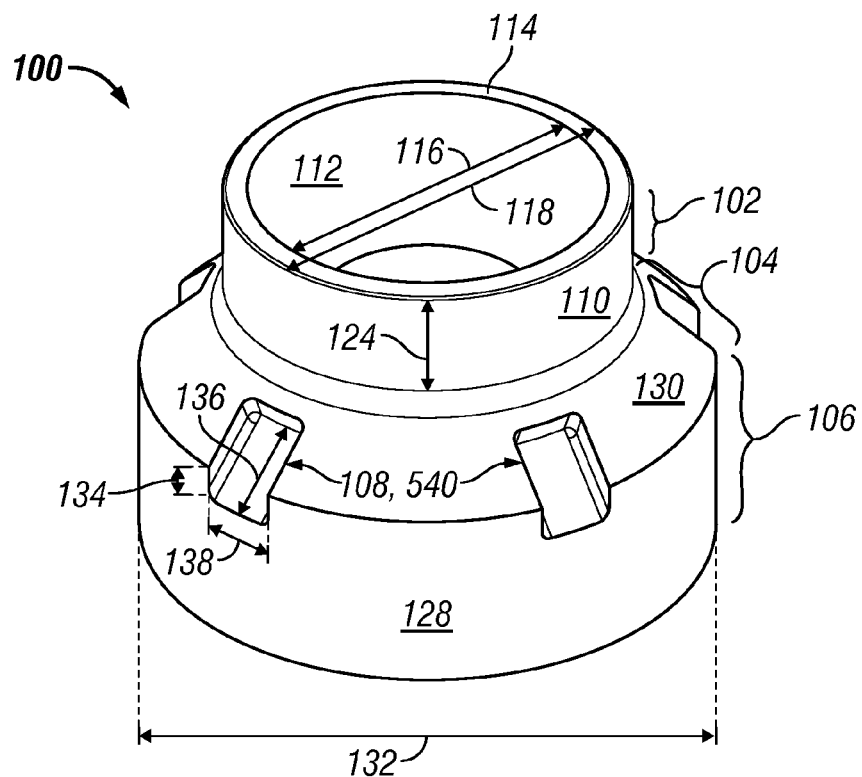
FIG. 5 is a perspective view of a blank in accordance with another embodiment of the present disclosure.

Referring now to FIG. 5, in some embodiments, recess 108 is in the form of one or more slots 540. In such an embodiment, slot 540 may be formed in outer surface 130 of angled section 104 and extend into outer surface 128 or other portion of base section 106. Slot 540 may be angular, as illustrated, or slot 540 may have any of a number of shapes suitable for engagement with at least one tip 702 of former 700 (illustrated in FIG. 7).

Figure 6:
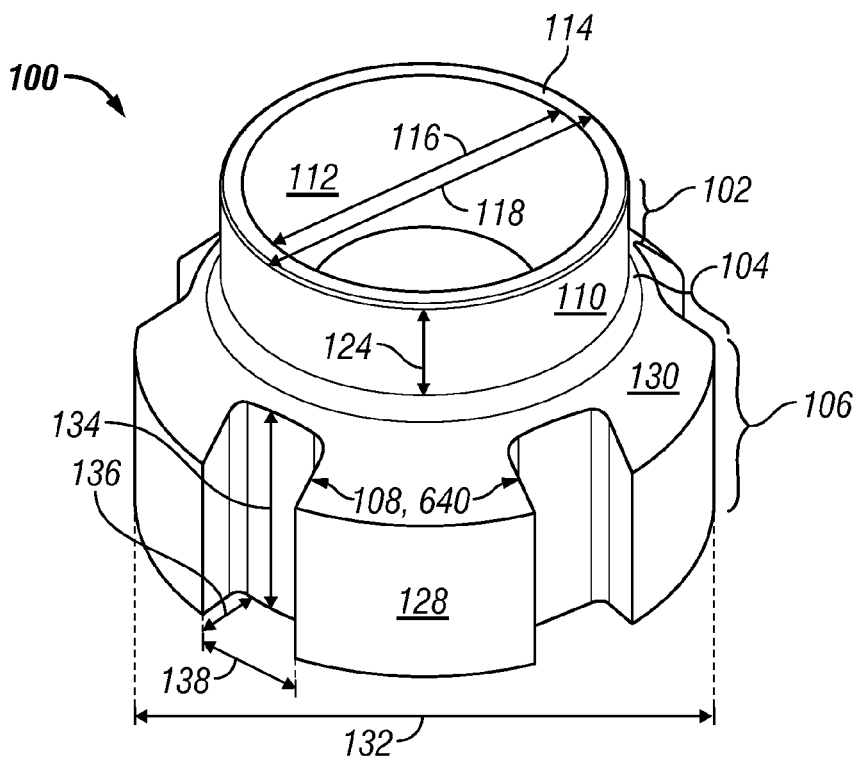
FIG. 6 is a perspective view of a blank in accordance with another embodiment of the present disclosure.

Referring now to FIG. 6, in some embodiments, recess 108 is in the form of one or more channels 640. In such an embodiment, channel 640 may be formed in outer surface 130 of angled section 104 and extend into or through base section 106, such that a portion of outer surface 128 of base section 106 is partially, or completely removed. Thus, the recess 108 may be shaped to engage more than just tip 702 of former 700 (illustrated in FIG. 7), and may engage a further portion (e.g., body 704) of former 700 (illustrated in FIG. 7). Channel 640 may be angular, as illustrated, or channel 640 may have any of a number of other shapes suitable for engagement with at least one tip 702 of former 700 (illustrated in FIG. 7).

In other embodiments (not shown), recess 108 may be a missing outer ring of a portion of angled section 104 and base section 106. In other words, outer diameter 132 of base section 106 may be reduced to a dimension which would allow it to fit within a former without the need for well 140, shoulder 240, moat 340, cutaway 440, slot 540, or channel 640. Thus, recess 108 may be in the form of any void, opening, or other removed or absent material leaving a space in blank 100 for engaging tip 702 of former 700 (illustrated in FIG. 7), including, but not limited to, any, all, or none of the above-described embodiments. When multiple recesses 108 are provided, each recess 108 may be shaped to engage corresponding tips 702 of former 700 (illustrated in FIG. 7). Likewise, multiple formers may engage a particular recess 108 and multiple recesses 108 may engage a particular former. The design of blank 100, and recess 108 in particular, may be standardized to cover multiple designs of matrix bits. Alternatively, the design of blank 100 and recess 108 may be tailored to cover very specific individual designs of matrix bits.

Figure 7:
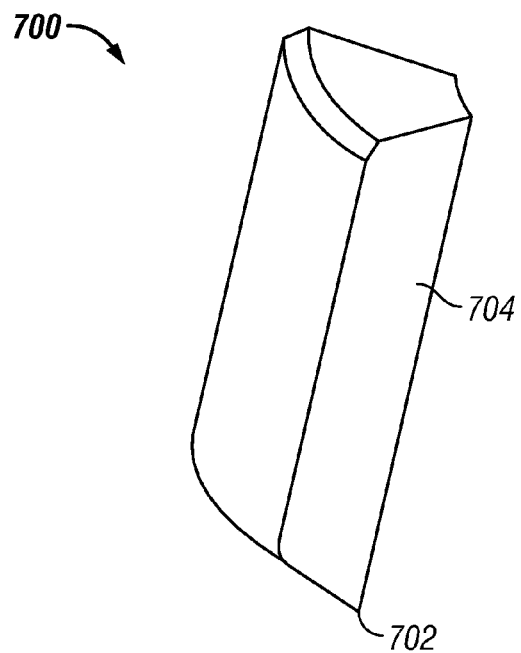
FIG. 7 is a perspective view of a former for use with a blank in accordance with one embodiment of the present disclosure.

Referring now to FIG. 7, former 700 may be a pre-constructed placeholder constructed of sand, graphite, or other materials useful for providing a void area in a molded device. For example, former 700 may be a junkslot sand piece used to provide a junkslot in matrix bit 800 (illustrated in FIG. 8). Depending on the desired configuration of the junkslot, former 700 may be used in various configurations. In some instances, former 700 is present on one side and not the other. In other instances, one or more formers 700 may be present on multiple sides, so as to provide multiple junkslots. In some applications, a back bevel or cutaway is provided in former 700 to allow an upper edge or tip 702 of former 700 to engage outer surface 130 of angled section 104 (illustrated in FIGS. 1-6). However, in the embodiments illustrated, no back bevel is necessary, as tip 702 may fully engage angled section 104 by at least partially entering recess 108 (illustrated in FIGS. 1-6). Some embodiments, such as the embodiment illustrated in FIG. 6 may engage more than tip 702 of former 700, and may allow at least a portion of body 704 of former 700 to engage blank 100.

Figure 8:
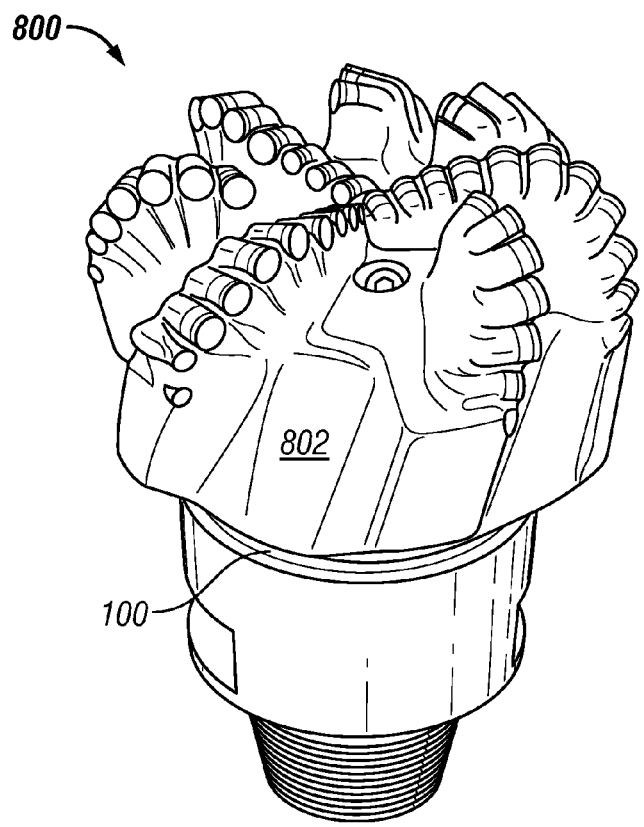
FIG. 8 is a perspective view of a matrix hit in accordance with one embodiment of the present disclosure.

Referring now to FIG. 8, matrix bit 800 may incorporate blank 100, along with matrix material 802 formed about blank 100. Any of the various embodiments described above may be used for blank 100 within matrix bit 800. Matrix material 802 may be formed of matrix powder 910 and metal alloy 914 in mold assembly 902, as illustrated in FIG. 9.

Figure 9:
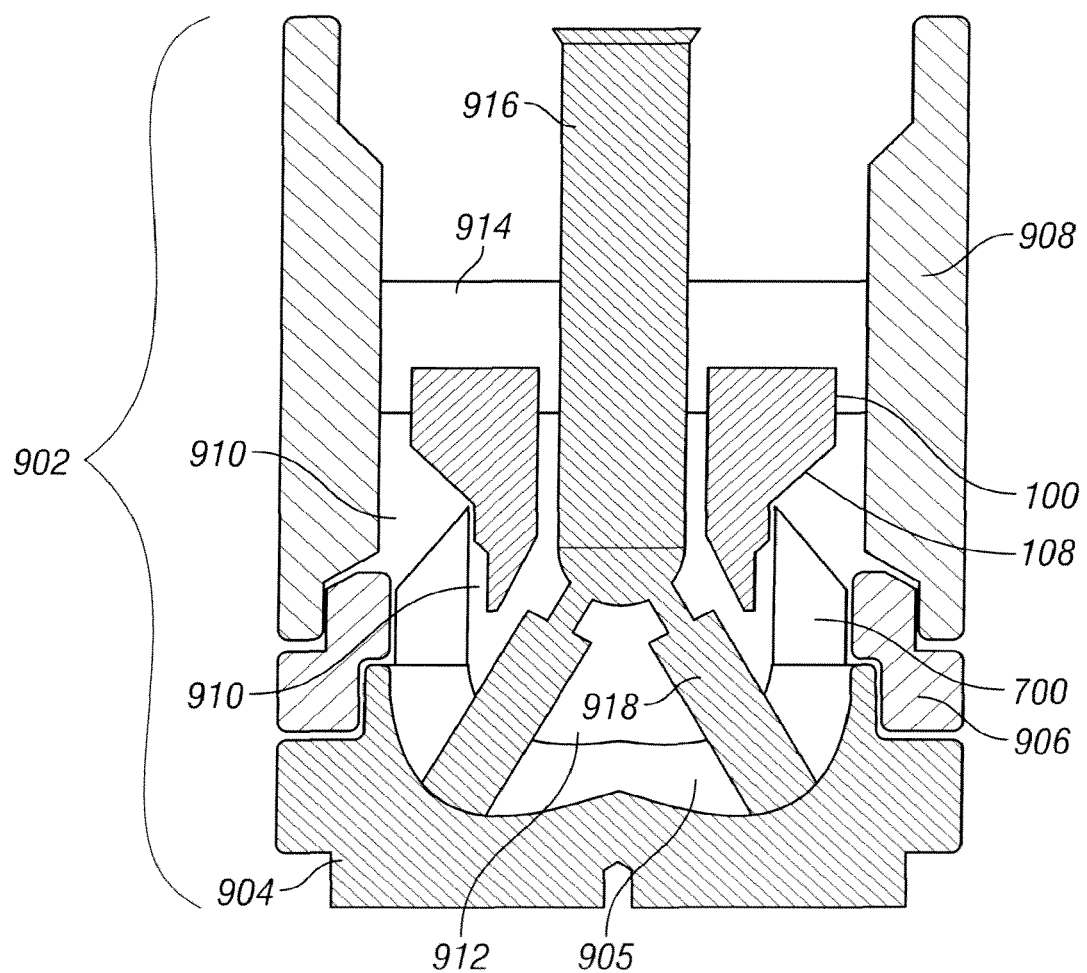
FIG. 9 is a cross-sectional view of a mold assembly for forming a matrix bit in accordance with one embodiment of the present disclosure.

Referring now to FIG. 9, matrix bit 800 (illustrated in FIG. 8) may be constructed as follows. First, mold assembly 902, which may be hollow, may be provided. Mold assembly 902 may include mold 904, top ring 906, and funnel 908. Mold 904, top ring 906, and funnel 908 may be arranged to form mold assembly 902, or mold assembly 902 may be otherwise provided. Mold 904 may include former 905 to engage and cooperate with former 700 to form a junk slot, for example. Former 905 may be constructed of graphite and may be attached to mold 904 prior to assembly of mold assembly 902. In some embodiments, former 700 and former 905 may either or both be an integral part of mold assembly 902. For example, former 700 may be formed integral with top ring 906 and former 905 may be formed integral with mold 904. When, upon assembly of mold assembly 902, former 700 or former 905 is not present, such former 700 or 905 may subsequently be placed in mold assembly 902. Optionally, one or more additional formers 700, sandstalk 916, and/or nozzle displacements 918 may be provided and placed in mold assembly.

Next, blank 100 may be provided and placed in mold assembly 902 in engagement with tip 702 of former 700. As illustrated, tip 702 of former 700 may engage recess 108 of blank 100. If multiple formers 700 are provided, blank 100 may be placed in engagement with tips 702 of two or more formers 700. Any of the various embodiments described above may be used for blank 100. One or more matrix powders 910, such as, but not limited to tungsten or tungsten carbide, may be placed into void 912 formed by mold assembly 902, formers 700 and 905, and blank 100. Once matrix powder 910 is in place, one or more metal alloys 914, such as, but not limited to, copper alloy, may be introduced on top of matrix powder 910 in void 912. Heat may be provided to melt metal alloy 914, at which time, the molten metal infiltrates into pore spaces between the particles of matrix powder 910. Sufficient heat may be provided, causing metal alloy 914 and matrix powder 910 to bond. Once metal alloy 914 and matrix powder 910 have bonded, they may be cooled. Whether cooled or not, they may be separated from mold assembly 902 and former 700 and excess material may be machined away to form matrix bit 800 (illustrated in FIG. 8). Since webbing may be substantially reduced or eliminated, such grinding may not require complex procedures commonly associated with removal of webbing, but may instead involve simple turning or other manufacturing treatments that are more cost-effective and efficient. Further, cracking occurring under the webbing may be reduced or eliminated when using the blank design described.

Thus, as compared with some blanks, the above-described blank 100 may have material absent, allowing for engagement with a junkslot or other former without the need for a hack bevel in the former, allowing for matrix bit 800 to be formed with minimized webbing. Such reduction or elimination of webbing may be accomplished without an increase in the overall length of matrix hit 800, and/or promoting better mechanical bonding between matrix material 802 and blank 100 in a blank bondline region. Further, such blank design may slow and hinder the propagation of a bondline crack once initiated and/or minimize the amount of matrix material 802 by allowing for blank 100 to be designed to occupy more volume in mold assembly 902.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

What is claimed is:

1. A matrix bit comprising:
   a blank comprising:
      a tang section having an outer surface having a diameter;
      a base section having an outer surface having a diameter greater than the diameter of the tang section; and
      an angled section between the tang section and the base section, the angled section having an outer surface that transitions from the outer surface of the tang section to the outer surface of the base section;
      wherein the outer surface of the angled section comprises a recess shaped to engage a tip of a former; and
   matrix material formed about the blank.

2. The matrix bit of claim 1, wherein the outer surface of the angled section of the blank transitions uniformly from the outer surface of the tang section to the outer surface of the base section.

3. The matrix bit of claim 1, wherein the tang section, the base section, and the angled section of the blank comprise steel.

4. The matrix bit of claim 1, wherein the recess of the blank is shaped to engage a further portion of the former.

5. The matrix bit of claim 1, wherein the recess of the blank extends into the base section.

6. The matrix bit of claim 5, wherein the recess of the blank extends through the base section.

7. The matrix bit of claim 1, wherein the outer surface of the angled section of the blank comprises at least two recesses, each recess being shaped to engage a tip of a former.

8. A method of forming a matrix bit, comprising:
   providing a hollow mold assembly;
   placing a former in the mold assembly;
   providing a blank comprising:
      a tang section having an outer surface having a diameter;
      a base section having an outer surface having a diameter greater than the diameter of the tang section; and
      an angled section between the tang section and the base section, the angled section having an outer surface that transitions from the outer surface of the tang section to the outer surface of the base section;

wherein the outer surface of the angled section comprises recess shaped to engage a tip of the former;

placing the blank in the mold assembly and in engagement with the tip of the former;

placing matrix powder into a void formed by the mold assembly, the former, and the blank;

placing a metal alloy in the void;

providing heat sufficient to cause the metal alloy and the matrix powder to bond;

separating the bonded metal alloy and matrix powder from the mold assembly and the former; and machining away excess material, so as to form the matrix bit.

9. The method of claim 8, comprising cooling the bonded metal alloy and matrix powder prior to separating the bonded metal alloy and matrix powder from the mold assembly and the former.

10. The method of claim 8, wherein the mold assembly comprises a mold, a top ring, and a funnel, the method comprising:

arranging the mold, the top ring, and the funnel into the mold assembly.

11. The method of claim 8, wherein the outer surface of the angled section of the blank comprises at least two recesses, each recess being shaped to engage a tip of a former, the method comprising:

providing an additional former in the mold assembly;

wherein placing the blank in the mold assembly comprises providing engagement between the blank and the tips of both of the formers.

* * * * *